United States Patent [19]
Fukutake et al.

[11] Patent Number: 5,509,676
[45] Date of Patent: Apr. 23, 1996

[54] SHOCK ABSORBER FOR A BICYCLE FRONT FORK

[75] Inventors: Heiji Fukutake, Toyonaka; Minoru Abe, Katano; Toru Fujii, Kyoto, all of Japan

[73] Assignee: Kabushiki Kaisha Daikin Seisakusho, Osaka, Japan

[21] Appl. No.: 372,465

[22] Filed: Jan. 13, 1995

[30] Foreign Application Priority Data

Jan. 26, 1994 [JP] Japan ................... 6-006856

[51] Int. Cl.⁶ .................................................. B62K 21/20
[52] U.S. Cl. ........................................ 280/276; 280/280
[58] Field of Search .............................. 280/275, 276, 280/277, 279, 280, 283, 286

[56] References Cited

U.S. PATENT DOCUMENTS

| | | | |
|---|---|---|---|
| 448,750 | 3/1891 | Kenfield | 280/276 |
| 589,394 | 8/1897 | Ohlgart | 280/276 |
| 783,236 | 2/1905 | Ashburn | 280/276 |
| 1,188,168 | 6/1916 | Genovese | 280/276 |
| 3,208,767 | 9/1965 | Moulton | 280/276 |
| 4,881,750 | 11/1989 | Hartmann | 280/276 |
| 5,308,099 | 5/1994 | Browning | 280/276 |

FOREIGN PATENT DOCUMENTS

| | | | |
|---|---|---|---|
| 98000 | 10/1897 | Germany | 280/276 |
| 360539 | 6/1938 | Italy | 280/276 |
| 937117 | 9/1963 | United Kingdom . | |
| 1047783 | 11/1966 | United Kingdom . | |
| 1062932 | 3/1967 | United Kingdom . | |
| 2255940 | 11/1992 | United Kingdom | 280/276 |
| 90/15748 | 12/1990 | WIPO | 280/276 |

Primary Examiner—Margaret A. Focarino
Assistant Examiner—Kevin Hurley
Attorney, Agent, or Firm—Shinjyu Office of Patent Attorneys

[57] ABSTRACT

The shock absorber mechanism for a bicycle (10) is a device mounted between the handlebar stem (4) and fork stem (5) of a bicycle and includes a sleeve case (11), a spring (18), and a free cushion bushing (20). The sleeve case (11) is mounted to the lower edge of the handlebar stem (4) and joins when the upper portion of said fork stem (5) slides freely and does not rotate. The spring (18) is arranged between the sleeve case (11) and the fork stem (5). The free cushion bushing (20) is mounted to the lower edge of the sleeve case (11) and can be freely installed and removed as well as slide on the outer peripheral surface of the fork stem (5) controls relative movement of the handlebar stem (4) and the fork stem (5) caused by friction on the outer peripheral surface of the fork stem (5). One purpose of the present invention is to allow for easy adjustment of the dampening characteristics of a dampener depending on bicycle riding conditions and rider requirements.

7 Claims, 4 Drawing Sheets

SHOCK ABSORBER FOR A BICYCLE FRONT FORK

BACKGROUND OF THE INVENTION

1. Field of the Invention

The present invention relates to a shock absorber incorporated into the mechanism that supports the front wheel of a bicycle on the frame of the bicycle. In particular, the invention pertains to a damping and buffering shock absorber mechanism mounted between the stem of a bicycle handlebar and the front wheel fork of a bicycle.

2. Description of the Related Art

Shock absorber mechanisms for motorcycles are well-known. For instance, shock absorber mechanisms have been mounted to the portion of the front of the motorcycle frame which supports the front fork and a handlebar stem. Further, such shock absorber mechanisms have been provided as a part of the handlebar stem and fork stem.

On a motorcycle, the shock absorber mechanism typically requires two parallel units because of size, weight and complexity of motorcycle itself. However, bicycles are smaller and lighter, generally, than motorcycles and therefore the complexity and massiveness of motorcycle shock absorber systems are inappropriate. Mountain bikes, in particular experience the shocks due to uneven surfaces and benefit greatly from shock absorbers. However, the motorcycle shock absorber systems, being massive and complex are difficult to properly arrange on a mountain bike frame.

Conversely, the handlebar stem type shock absorber mountable between the handlebar stem and fork stem of the front of a mountain bike could absorb impacts using one shock absorber mechanism, if one would fit into the small dimensions of a bicycle frame. Such a mechanism would need to have the advantage of less parts and lighter weight. A well-known example of this type of shock absorber mechanism is the HeadShok™ manufactured by the American company Cannondale. In the HeadShok™, there is an oil/air pressure system and a urethane rubber system. The oil/air pressure system obtains a buffering effect using an air pressure cylinder and a dampening effect using an oil pressure cylinder. Further, the urethane rubber system obtains a buffering effect and a dampening effect using urethane rubber.

Because the conventional oil/air pressure system shock absorber mechanism uses an oil cylinder, if an oil leak occurs due to deterioration with age or damage to the packing, the packing must be replaced. This is something that makes maintenance difficult. Moreover, the urethane rubber characteristics of the urethane rubber system change due to deterioration with age. Further, only one material is used for both the buffering effect and dampening effect. Consequently, the dampening and buffering characteristics cannot be independently changed. Settings for the buffering effect and dampening effect, depending on the road surface and usage conditions, cannot be changed or fine tuned.

SUMMARY OF THE INVENTION

One of the purposes of the present invention is to make it easy to change the characteristics of a dampening assembly depending on riding conditions or requirements of a bicycle rider.

In one aspect of the present invention, a shock absorber mechanism is rotatably mounted between the handlebar stem and fork stem of a bicycle within the head tube of a bicycle frame. The shock absorber mechanism includes a sleeve case, an elastic material and a friction material. The sleeve is formed with upper and lower holes. The handlebar stem is mounted in the upper hole and the fork stem which supports a front wheel is slidably but non-rotatably mountable the lower hole.

The elastic material may be, for instance, a removable spring disposed axially in the lower hole. The spring is compressible and extensible within the lower hole in response to slidable movement of the fork stem. The friction member is removably retained at a lower end of the lower hole at least partially within the sleeve, and produces friction in response to sliding movement of the fork stem.

A removable check plug is disposed at the lower end of the lower hole and retains the fork stem and the spring within the lower hole. A removable cap ring is disposed at a lower end of the check plug, the removable friction member disposed within the check plug and retained therein by the cap ring.

The elastic material can be installed and removed and is arranged between the sleeve case and the fork stem. The friction material is mounted to the lower edge of the sleeve case that can be installed and removed as well as freely slide with respect to the outer peripheral surface of the fork stem. Further, the sleeve case includes upper and lower bearing receivers which receive a pair of upper/lower bearings arranged at the top and bottom of the head tube and the friction material can be mounted to the lower bearing receiver. A separation prevention part is also formed to prevent separation of the fork stem from the sleeve case in the lower bearing receiver. Moreover, a first adjustment mechanism can be included which modifies the shape and characteristics of the elastic material and a second adjustment mechanism can also be included which modifies the shape and characteristics of the friction material.

In a shock absorber mechanism of the present invention, the fork stem mounted to the front wheel slides inside the sleeve case in response to a load from the road surface. The buffering characteristics during this time can change depending on the elasticity constants of the elastic material. Further, the sliding motion of the fork stem is controlled by the friction material. Because of this, the dampening characteristics can change depending on the type of friction material. Consequently, the buffering characteristics and dampening characteristics can separately and freely change depending on the conditions by replacing this elastic material and friction material. Also, since these can be installed and removed, the maintenance is simple as well.

In a shock absorber mechanism related to another point of view of this invention, the fork stem mounted to the front wheel slides inside the sleeve case in response to a load from the road surface.

The buffering characteristics during this time can change depending on the elasticity constants of the elastic material. Further, the sliding motion of the fork stem is controlled by the friction material Because of this, the dampening characteristics can change by changing the shape of the friction material and altering the sliding condition. Consequently, the buffering characteristics and dampening characteristics can separately and freely change depending on the conditions by replacing this elastic material and friction material.

If the friction material is mounted to the lower bearing receiver, the number of parts can be reduced. Further, if separation prevention material is formed on the lower bearing receiver, a simple construction can prevent the fork stem from slipping off. Even further, the buffering characteristics and dampening characteristics can change if the shape of the buffering material changes by the first adjustment mechanism and if the shape of the dampening material changes by the second adjustment mechanism.

DETAILED DESCRIPTION OF THE PREFERRED EMBODIMENTS

Figure 1:
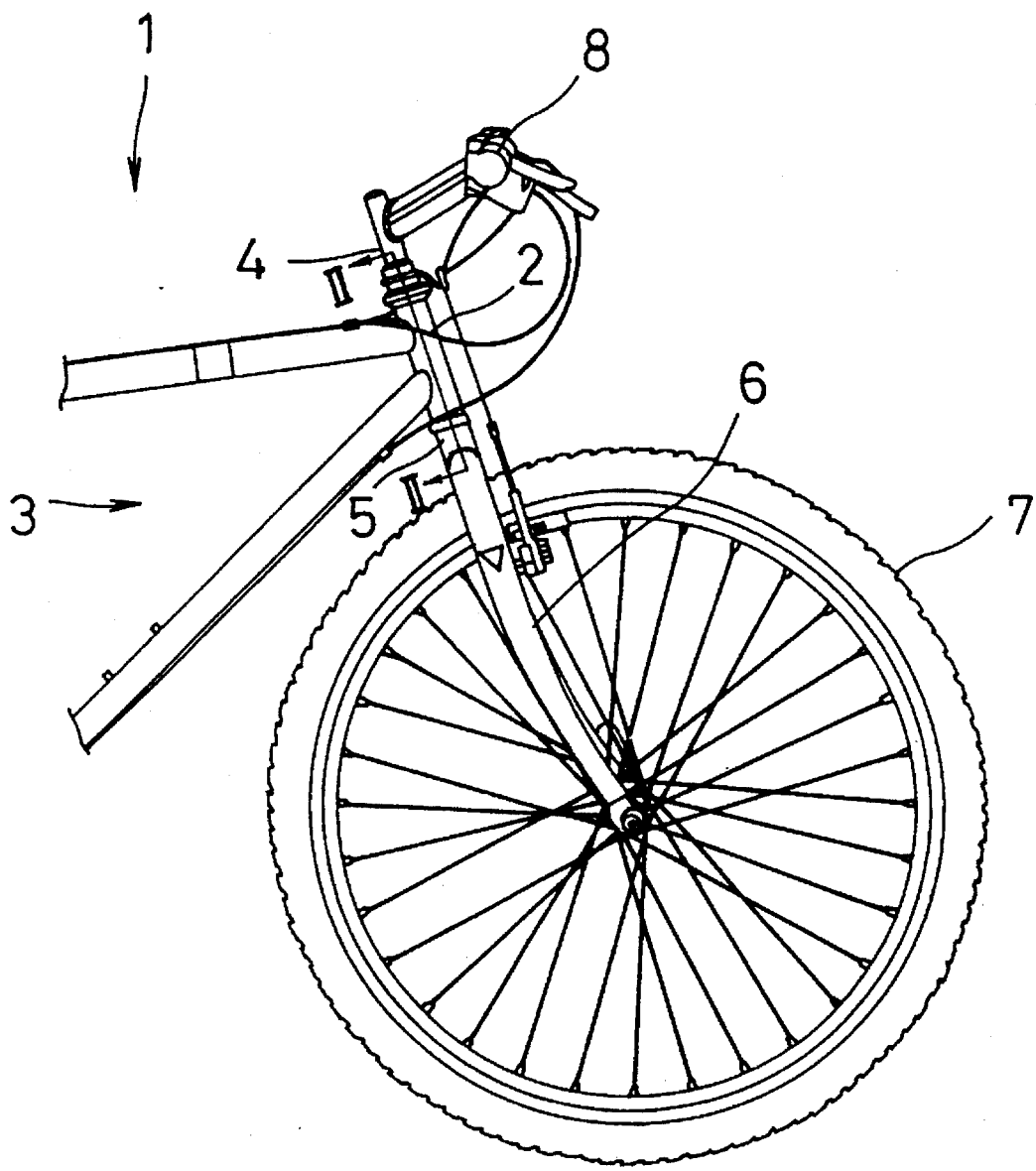
FIG. 1 is a fragmentary side elevation of a mountain bike provided with a front fork shock absorber mechanism in accordance with a first embodiment of the present invention.
Figure 2:
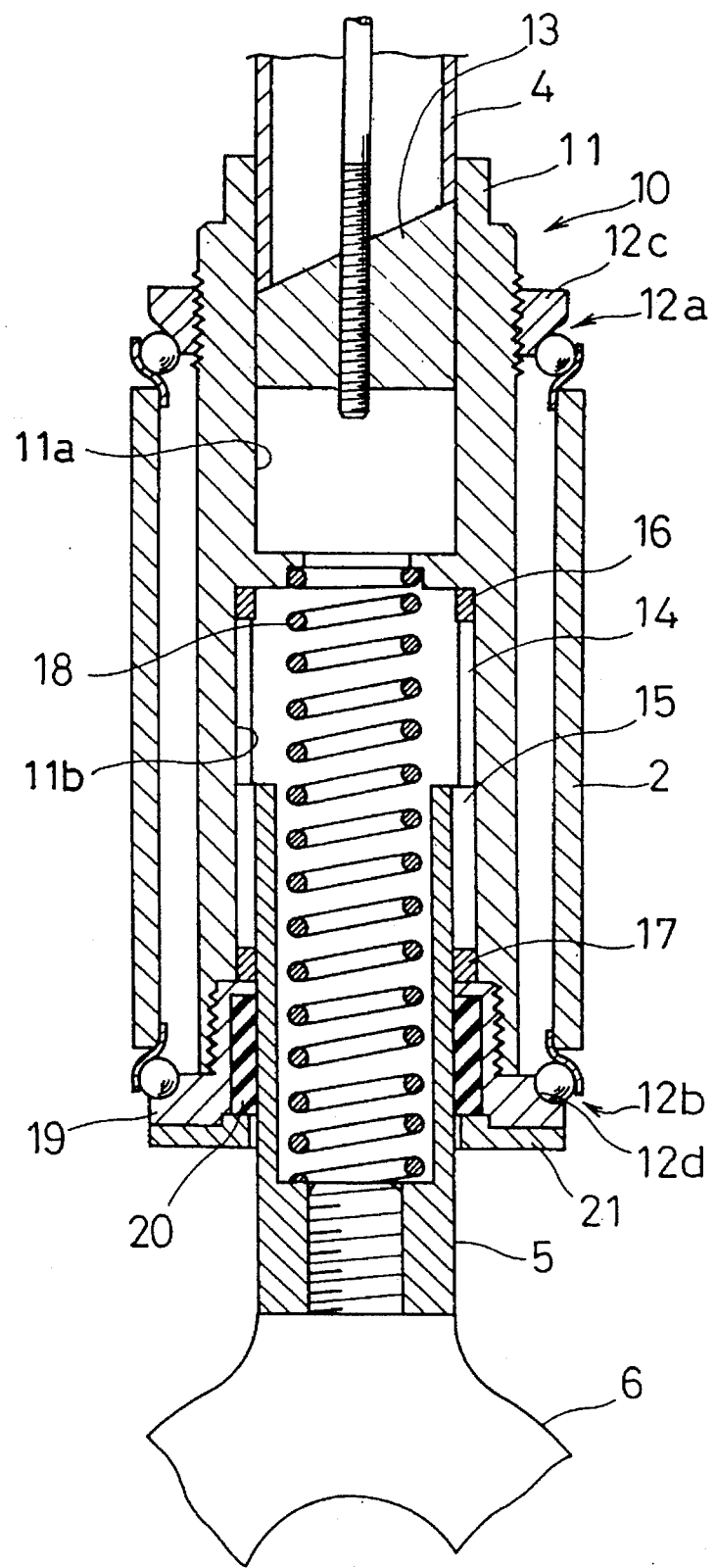
FIG. 2 is a fragmentary, partial cross-section of the shock absorber mechanism taken along the line II—II in FIG. 1, on a slightly enlarged scale, looking in the direction of the arrows.

Objects, features, aspects and advantages of the present invention will become more fully apparent from the following detailed description when taken in conjunction with the accompanying drawings where like reference numerals denote corresponding parts throughout, in which FIG. 1 represents a front portion of a mountain bike 1 in accordance with a first embodiment of the present invention. The front of a main frame 3 of the mountain bike 1 includes a head tube 2. A handlebar stem 4 is rotatably disposed within the head tube 2 which supports handlebars 8. A fork stem 5 is coupled to the lower portion of the handlebar stem 4 via a shock absorber mechanism 10, as is shown in FIG. 2 and described further below. A front fork 6 extends from the fork stem 5 and supports a front wheel 7 in a manner well known in the art.

FIG. 2 shows the shock absorber mechanism 10 supported in the head tube 2. The shock absorber mechanism, 10 includes a sleeve 11, rotatably supported by bearings 12a, 12b disposed along the top and bottom rims of the head tube 2. The sleeve 11 includes a first hole 11a in its upper portion, open to the upper end of the sleeve 11. The sleeve 11 also includes a second hole 11b formed in its lower portion, open to the lower end of the sleeve 11. A bearing cup 12c to the bearing 12a is screwed onto the periphery of the upper portion of the sleeve 11.

The handlebar stem 4 is retained in the hole 11a of the sleeve 11 and may be installed and removed via an elevating wedge 13 within the upper end of the sleeve 11. The hole 11b of the sleeve 11 is grooved with internal splines 14. The upper end of the fork stem 5 extends into the hole 11b and is provided with external splines 15 which engage the splines 14. The fork stem 5 is thus slidably but nonrotatably joined with the sleeve 11, and thereby coupled with the handlebar stem 4.

The shock absorber mechanism 10 also includes cushions 16, 17, preferably made of an elastic material such as urethane, rimming upper and lower ends of the internal splines 14 along the interior of the sleeve 11. The shock absorber mechanism 10 further includes a compressed spring 18 acting as a damper between the sleeve 11 and the fork stem 5.

A threaded drop-check sleeve 19 of the shock absorber mechanism 10, for retaining the fork stem 5 from dropping out of the sleeve 11, is screwed into the opening at the lower end of the sleeve 11. A bearing cup 12d is formed along a rim of the drop-check sleeve 19 corresponding to the bearing 12b. A free bushing 20 is disposed as a buffering friction material along the inner peripheral surface of the drop-check sleeve 19.

Figure 3:
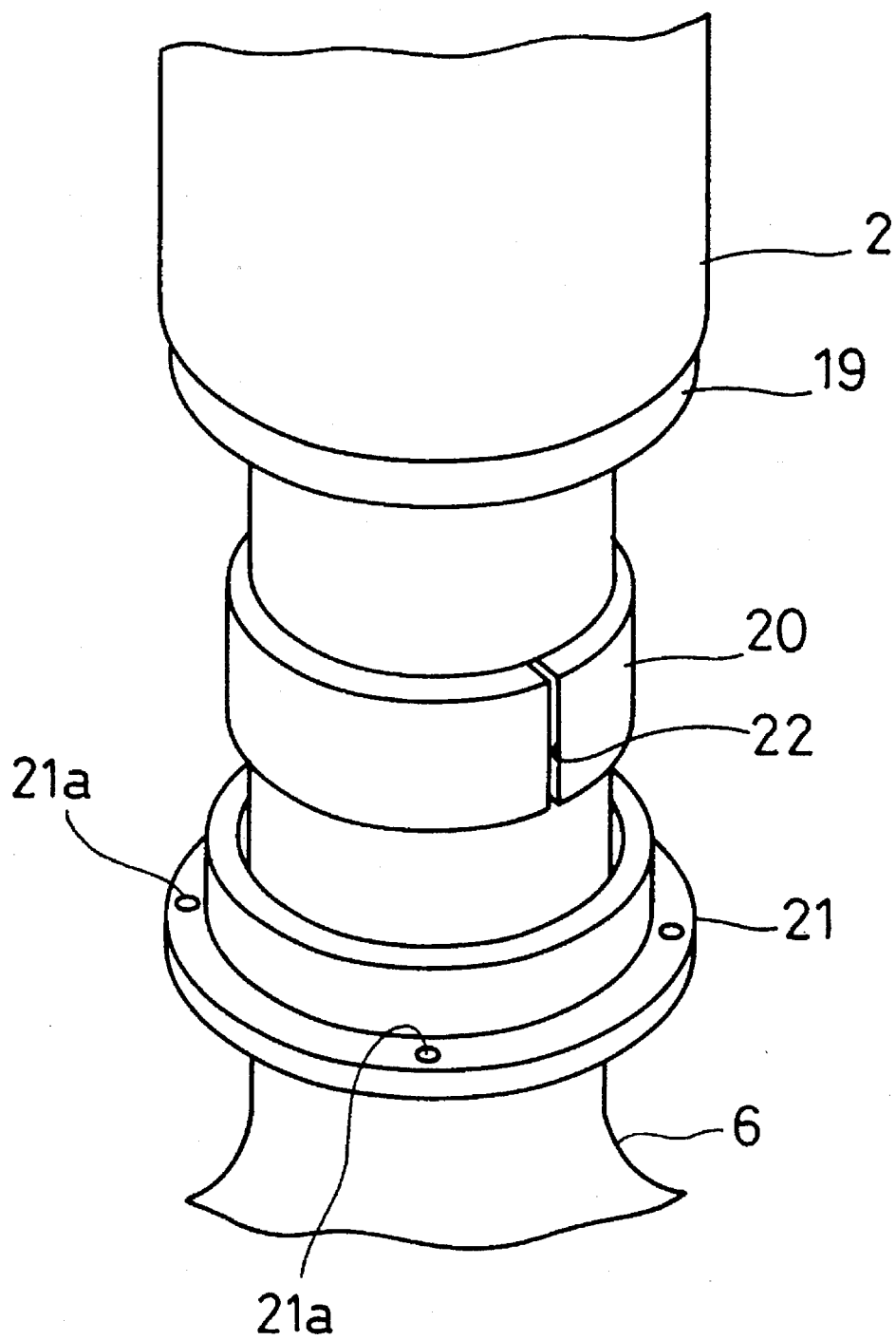
FIG. 3 is a fragmentary isometric view of a lower portion of the shock absorber mechanism, showing several of the parts of the mechanism partially disassembled.

As shown in FIG. 3, the free bushing 20, which can be made of urethane rubber, for example, is generally tubular, but is slit by an axial notch 22. The free bushing 20 is in slidable contact with the outer peripheral surface of the fork stem 5, and by friction, the free bushing 20 serves as a buffer to limit the movement of the handlebar stem 4 relative to the fork stem 5. A cap ring 21, supplied to provide independent access for replacing the free bushing 20, is fastened into the lower end of the drop-check sleeve 19 by any of a variety of means, such as screws (not shown) which may extend through the holes 21a into corresponding holes (not shown) in the threaded drop-check sleeve 19. Or, alternatively, the cap ring 21 may be provided with threads (not shown) and unscrewed from the drop-check sleeve 19.

Procedures for replacing the spring 18 and the free bushing 20 are as follows. To replace the spring 18, and in order to change the damping characteristics of the shock absorber 10, peripheral parts on the front of the bike 1 such as the brake cable are first removed, as necessary. Without unfastening the cap ring 21, the drop-check sleeve 19 can then be unscrewed as an assembly containing the free bushing 20 and withdrawn from the sleeve 11. Consequently, the fork stem 5 can be dropped from the sleeve 11. With the fork stem 5 removed from the sleeve 11, the spring 18 can be easily drawn out and replaced. The fork stem 5, housing a new spring 18, is then inserted into the sleeve 11. To complete the operation replacing the spring 18, the drop-check sleeve 19 is screwed into the lower end of the sleeve 11.

To replace the free bushing 20, on the other hand, in order to restore frictional dampening characteristics lost to abrasion, the cap ring 21 is unfastened from the drop-check sleeve 19, as shown in FIG. 3. The cap ring 21 can then be lowered to rest on the fork 6 at the base of the fork stem 5. Using a suitable tool, the free bushing 20 is then extracted from the drop-check sleeve 19. At this point, since the free bushing 20 is broken by the notch 22, it can be opened and easily removed from the from fork stem 5. A fresh free bushing 20 can be installed inside the drop-check sleeve 19 by first simply spreading it apart and pushing it onto the fork stem 5. The cap ring 21 is then slid to press the free bushing 20 into the drop-check sleeve 19, and refastened to the drop-check sleeve 19.

As the foregoing illustrates, both the spring 18 and the free bushing 20 are easily replaceable, and furthermore enable ready changing of the buffering and dampening characteristics of the shock absorber mechanism 10. For instance, if altered dampening characteristics are desired, the a stiffer or more flexible spring 18 may be installed. Further, the free bushing 20 may be made of differing thicknesses or materials providing differing degrees of friction contact with the fork stem 5 in order to alter the dampening characteristics of the invention.

Figure 4:
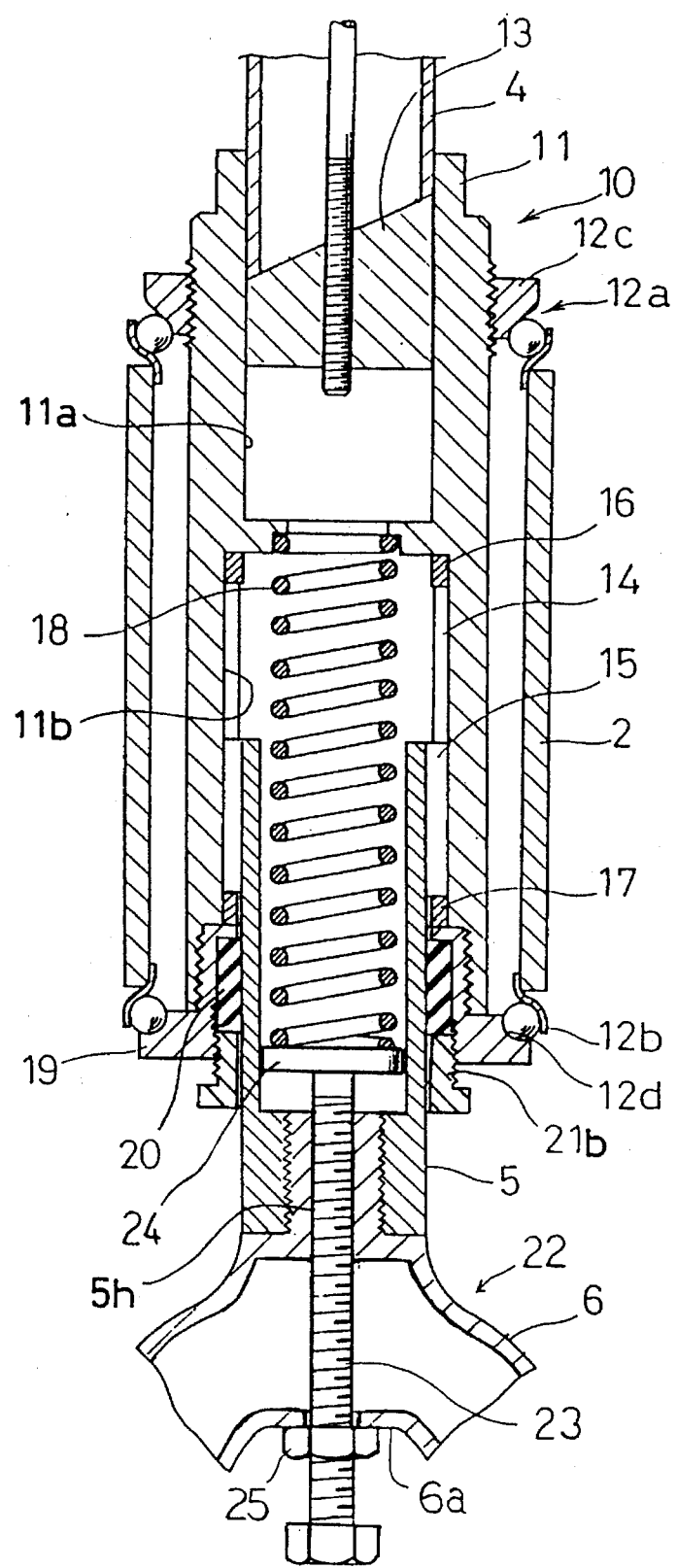
FIG. 4 is a fragmentary, partial cross-section of the shock absorber mechanism, similar to FIG. 2, showing an alternate embodiment of the present invention.

FIG. 4 illustrates an alternate embodiment of a shock absorber mechanism 10 according to the present invention. In one aspect of this embodiment, the damping characteristics exhibited by the spring 18 of the shock absorber mechanism 10 are adjustable without the disassembly of the mechanism through a pressure adjustment mechanism 22. The pressure adjustment mechanism 22 includes a pressure adjustment bolt 23, penetrating the crotch of the fork 6 extending upward through a threaded hole 5h formed in the base of the fork stem 5. A pressure disc 24 is rotatably attached to the top of the bolt 23. The pressure disk 24 engages the bottom of the spring 18 and moves upwards or downwards in response to rotation of the adjustment bolt 23 to compress or release tension on the spring 18 as desired by the bike rider.

The pressure adjustment bolt 23 is screwed into or out from the base of the fork stem 5, in an adjustment which can be set with a lock nut 25, to vary the compression of the spring 18, and thereby the damping characteristics of the shock absorber mechanism 10.

In another aspect of this alternate embodiment of the present invention, the buffering characteristics exhibited by the free bushing 20 of the shock absorber 10 are adjustable without disassembly of the mechanism through a cap ring 21b pressing against the free bushing 20 as shown in FIG. 4.

The cap ring 21b corresponds to the cap ring 21 of the previous embodiment, and likewise is fastened, in this case screwed, into the lower end of the drop-check plug 19. Therein, an upper rim of the cap ring 21b presses against the lower end of the free bushing 20. Screwing the cap ring 21b in or out of the drop-check sleeve 19 accordingly deforms the free bushing 20, changing the sliding friction arising between the interior of the free bushing 20 and the outer peripheral surface of the fork stem 5. The buffering characteristics of the free bushing 20 are in this way adjustable through the cap ring 21b.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A shock absorber mechanism disposed between handlebar and fork stems in a bicycle head tube, comprising:

a sleeve having separated upper and lower interior portions, the upper sleeve portion configured for retaining the handlebar stem of a bicycle, and the lower sleeve portion configured for retaining the fork stem of a bicycle such that the fork stem is slidable but non-rotatable within said sleeve;

a removable spring disposed axially in said lower sleeve portion, wherein the spring is compressible and extensible between said lower sleeve portion and the fork stem of a bicycle;

a deformable friction member retained in a bottom end of said lower sleeve portion, and slidable along a peripheral portion of the fork stem of a bicycle; and a friction member retainer adjustably fastened into said bottom end of said lower sleeve portion such that said friction member retainer can variably deform said deformable friction member.

2. A shock absorber mechanism according to claim 1, wherein said sleeve includes bottom and top end bearing assemblies for rotatably positioning and supporting said sleeve within a bicycle head tube, and said friction member is retained in said bottom end bearing assembly.

3. A shock absorber mechanism in according to claim 2, further comprising a drop-check member for retaining the fork stem within the head tube of a bicycle, said drop-check member including said bottom end bearing assembly and retaining said deformable friction member, and further receiving said friction member retainer.

4. A shock absorber mechanism in according to claim 1, further comprising a spring adjustment mechanism disposed in said fork stem and extending into said lower portion for adjusting biasing characteristics of said spring.

5. A shock absorber mechanism for a handlebar and fork stem of a bicycle head tube, comprising;

a sleeve rotatably mountable into a head tube of a bicycle frame, said sleeve having upper and lower holes formed therein, a handlebar stem mountable in said upper hole and a fork stem for supporting a front wheel slidably but non-rotatably mountable in said lower hole;

a removable spring disposed axially in said lower hole, wherein said spring is compressible and extensible within said lower hole in response to slidable movement of said fork stem; and a removable friction member retained at a lower end of said lower hole at least partially within said sleeve, which produces friction in response to sliding movement of said fork stem; and a removable check plug disposed at the lower end of said lower hole which retains said fork stem and said spring within said lower hole.

6. A shock absorber mechanism for a handlebar and fork stem of a bicycle head tube, comprising:

a sleeve rotatably mountable into a head tube of a bicycle frame, said sleeve having upper and lower holes formed therein, a handlebar stem mountable in said upper hole and a fork stem for supporting a front wheel slidably but non-rotatably mountable in said lower hole;

a removable spring disposed axially in said lower hole, wherein said spring is compressible and extensible within said lower hole in response to slidable movement of said fork stem; and a removable friction member retained at a lower end of said lower hole at least partially within said sleeve, which produces friction in response to sliding movement of said fork stem; and a removable cap ring disposed at a lower end of said check plug, said removable friction member disposed within said check plug and retained therein by said cap ring.

7. A shock absorber mechanism for a handlebar and fork stem of a bicycle head tube, comprising:

a sleeve rotatably mountable into a head tube of a bicycle frame, said sleeve having upper and lower holes formed therein, a handlebar stem mountable in said upper hole and a fork stem for supporting a front wheel slidably but non-rotatably mountable in said lower hole;

a removable spring disposed axially in said lower hole, wherein said spring is compressible and extensible within said lower hole in response to slidable movement of said fork stem; and a removable friction member retained at a lower end of said lower hole at least partially within said sleeve, which produces friction in response to sliding movement of said fork stem; and a removable cap ring disposed at a lower end of said lower hole, said removable friction member disposed within said lower hole and retained therein by said cap ring.

* * * * *